United States Patent

Strobel

[15] 3,688,854
[45] Sept. 5, 1972

[54] BALANCE WITH ELECTROMAGNETIC COMPENSATION

[72] Inventor: Felix Strobel, Greifensee, Switzerland

[73] Assignee: Mettler Instruments AG, Zurich, Switzerland

[22] Filed: Nov. 9, 1971

[21] Appl. No.: 196,886

[30] Foreign Application Priority Data

March 1, 1971 Switzerland..............2975/71

[52] U.S. Cl. .................177/164, 177/210, 177/212, 177/DIG. 5
[51] Int. Cl. .........................G01g 7/04, G01g 23/16
[58] Field of Search..........177/210, DIG. 5, 164, 212

[56] References Cited

UNITED STATES PATENTS

| | | | |
|---|---|---|---|
| 2,407,513 | 9/1946 | Pounds | 177/210 |
| 2,880,985 | 4/1959 | Roberts | 177/122 |
| 3,079,792 | 3/1963 | Hubbs | 177/212 |
| 3,092,197 | 6/1963 | Ecker | 177/212 |
| 3,142,349 | 7/1964 | Blodgett | 177/164 |
| 3,172,493 | 3/1965 | Von Kock et al. | 177/210 |
| 3,182,495 | 5/1965 | Johnson | 177/210 |
| 3,186,504 | 6/1965 | Van Wilgen | 177/210 |
| 3,322,222 | 5/1967 | Baur | 177/210 |
| 3,519,095 | 7/1970 | Tomes | 177/210 |

FOREIGN PATENTS OR APPLICATIONS 261,763   9/1965   Australia ..................177/212

*Primary Examiner*—Robert S. Ward, Jr.
*Attorney*—Lawrence E. Laubscher

[57] ABSTRACT

Electromagnetically compensated weighing apparatus of the type including a load member connected with a frame for movement in a stationary magnetic field upon the application thereto of a load to be measured, and load compensating means including a compensating coil connected with said load member for producing a load magnetic force that reacts with said magnetic field to return the load member to its original neutral position, characterized by the provision of novel correction means for varying the strength of said magnetic field to eliminate the deleterious effects of external factors such as elevation, inclination, temperature and magnet aging. In the preferred embodiment, a correcting coil is mounted on a ferromagnetic portion of the magnetic means that establishes the magnetic field, the current flowing through said correcting coil being varied as a function of the deviation of a reference member from an initial equilibrium position relative to the frame.

10 Claims, 1 Drawing Figure

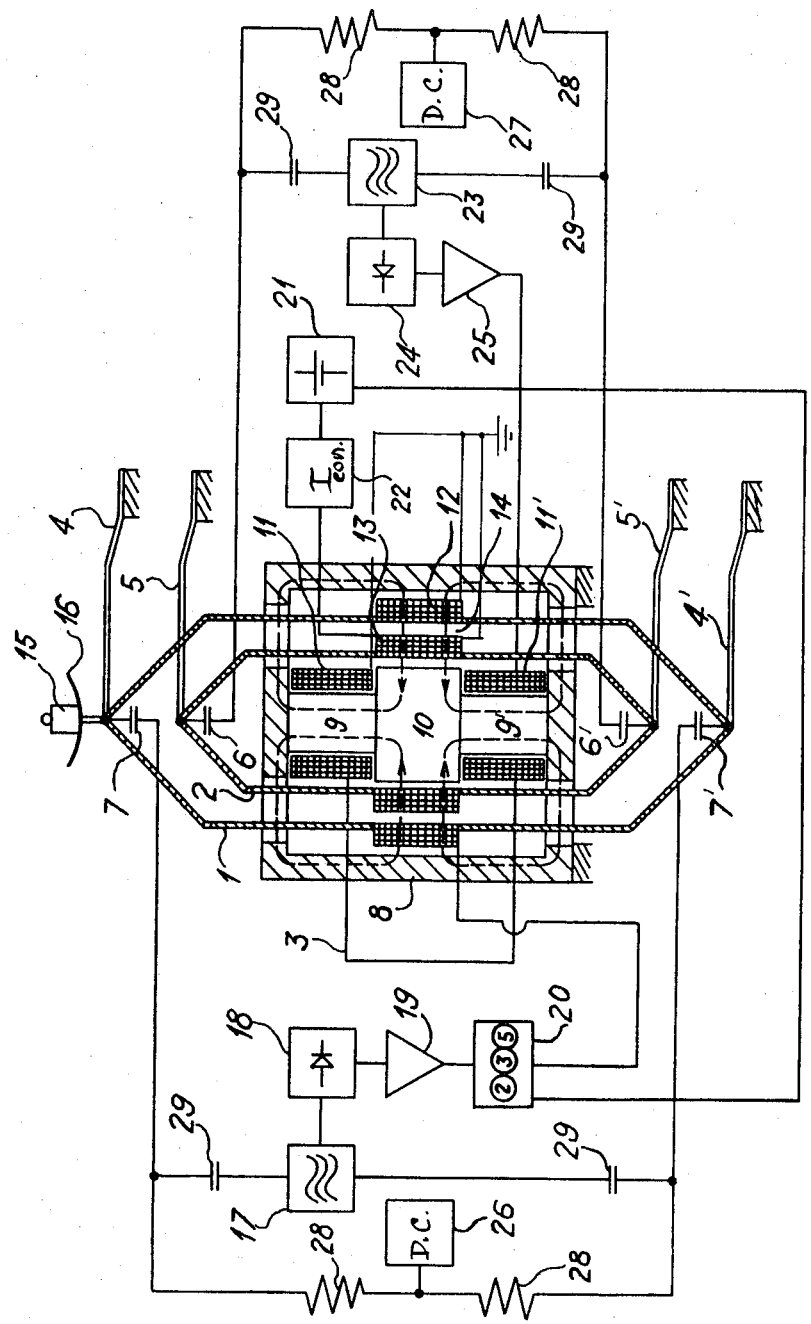

BALANCE WITH ELECTROMAGNETIC COMPENSATION

This invention relates generally to electromagnetically compensated weighing apparatus of the type in which a movable load member is deflected from an initial no-load neutral position upon the application of a load thereto. Sensing means operable in response to said deflection apply a compensating current through a compensating coil connected with said load member and arranged in a stationary magnetic field. The current flowing through said compensating coil produces a current flow that generates a load compensation force that reacts with said magnetic field to return the load member to the neutral position, the magnitude of the compensating current being a measure of the mass of the load being weighed.

Such balances generally operate as force-compensating balances. In such balances, if any influence on the weighing result due to the change in acceleration owing to gravity is to be taken into account, calibration is necessary at each place of installation of the balance.

A further source of error which detrimentally affects the precision of the weighing operation arises from the balance being in an inclined position, whereby only the cosine component of the load becomes effective for the weighing operation.

Finally, in such balances, variations in the magnetic field as a result of temperature fluctuations and/or aging of the magnets serve as a source of error.

It is desirable, and even necessary in the case of balances with high requirements as regards weighing precision, that these sources of error be virtually eliminated. One possible advantageous way of doing this is to operate the balance on the basis of comparison of weight, for example, by the balance being provided with a reference device. Such a balance is disclosed in the Baur U. S. Pat. No. 3,322,222, wherein there are arranged between two horseshoe magnets a load member and a reference member, the latter having a constant mass. Each of the two members has its own inductive sensing device and a corresponding compensation circuit for returning that member to its initial neutral position. The voltages corresponding to the compensation currents are compared, and the relationship of the difference between the load and reference voltages relative to the reference voltage is used as a measurement of the load to be measured.

In this prior method, variations in the magnetic field are acceptable as they influence both the load member and the reference member in the same manner; and consequently the weight measurement is thus made independent of the magnetic field being maintained at a precise value. One disadvantage of the above balance is that an expensive device (namely, the means for measuring the aforementioned voltage relationship) is necessary for evaluating or reading off the measuring result. A further shortcoming of the above-described known construction is that according to known rules of calculation of error, the errors of individual values which are multiplied together or related to each other, are added together, with a good approximation to the overall error of the result. Now in this case, in each weighing operation, two individual weighing steps are in principle effected, that of the load member and that of the reference member; the voltages corresponding to the compensation currents are determined, related to each other, and provide a value corresponding to the weight to be measured. Now if both individual weighing steps have for example the same relative error, the result suffers from double the error of the individual weighing step. The present invention was developed to avoid the above and other drawbacks of the known weighing apparatus.

Accordingly, a primary object of the present invention is to provide an improved electromagnetically compensated weighing apparatus including, in combination, a load member connected with a frame for movement in a stationary magnetic field upon the application thereto of a load to be measured, load compensating means including a load compensating coil connected with said load member for producing a load compensation force that reacts with said magnetic field to return the load member to its original neutral position, and correction means for varying the strength of said magnetic field to eliminate the deleterious effects of elevation, inclination, temperature and/or magnet aging.

According to a more specific object of the invention, the correction means includes a correction coil that is mounted on the ferromagnetic portion of the magnet means that generates the stationary magnet field. The current flowing through this correction coil is varied as a function of the displacement of a reference member from an equilibrium position in the magnetic field. The reference member is normally biased toward its equilibrium position by the reaction between said magnetic field and a constant reference magnetic force that is produced by the flow of constant current through a reference compensating coil mounted on said reference member.

In accordance with a further object of the invention, means are provided for compensating for fluctuations in the voltage of said constant voltage source, said compensating means including circuit means for connecting said constant voltage source with the indicator means that indicates the mass of the load as a function of the load compensating current.

In accordance with a further object of the invention, electrostatic means are provided for compensating for variations in the restoring force of the spring means that support the load and reference members, respectively. To this end, use is made of the capacitive components of the deviation sensing means of the load and reference members, respectively, in association with direct-current voltage sources that superimpose high biasing voltages upon the high frequency alternating-current deflection signals.

Other objects and advantages of the invention will become apparent from a study of the following specification when viewed in the light of the accompanying drawing, the single figure of which is an electrical schematic diagram illustrating in cross section the structural components of the weighing apparatus, certain parts having been omitted for clarity.

The balance selected for description is a beamless top-pan balance in which the load member, the reference member and the correction coils are substantially symmetrical about their longitudinal axes and are arranged with their essential parts concentric to each other. In this arrangement, the individual coils are in reciprocal action within the magnetic field of a pot system of permanent magnetic means, thereby making the balance of a particularly compact arrangement.

The drawing consists of a single figure which partially schematically illustrates the invention.

The balance comprises a load member 1 in the form of a substantially closed cylindrical hollow body which in turn encloses a reference member 2 which is basically of the same construction as but is slightly smaller than the load member 1. Arranged within the reference member 2 is a correction coil system 3.

The load member 1 is resiliently guided in a vertical direction by cantilevered leaf springs 4 and 4', while the reference member 2 is similarly guided by cantilevered leaf springs 5 and 5'. The springs 4 and 4', 5 and 5' are connected with the stationary balance frame to support each of the load and reference members in a parallelogram manner.

Arranged in the vicinity of the upper and lower ends of the reference member 2 and the load member 1 are capacitively operable position sensing devices 6 and 6', 7 and 7', respectively.

A round pot magnet 8 encloses two cylindrical permanent magnets 9, 9' which cooperate with the core 10 to form the internal part of the magnet system.

Mounted on the two magnets 9 and 9' are two stationary correction coils 11 and 11', respectively, which are electrically connected together. Load and reference compensation coils 12 and 13 carried by the load and reference members, respectively, are vertically movable and concentrically arranged relative to each other, said coils being arranged in the air gap 14 between the core 10 and the pot magnet 8.

During a weighing operation, a load 15 to be weighed is placed on the load pan 16 which is mounted on the upper end of the load member 1. This causes the load member 1 to be moved vertically downwardly out of its initial no-load neutral position, whereupon each of the sensing means 7 and 7' experiences a change in its capacitance, thereby producing a displacement signal voltage for activating an oscillator 17. The resulting signal from oscillator 17 is rectified by rectifier means 18 and is amplified by amplifier 19, whereupon the resultant load compensating current is applied through load coil 12 to generate a load magnetic force that reacts with the stationary magnetic field to return the load member to its initial neutral position. The magnitude of the load compensation current flowing through coil 12 is proportional to the mass of the load 15 being measured, which current is indicated by means of the digital voltmeter 20.

The reference member 2 is normally biased toward initial equilibrium position by the application of a constant compensating current through the reference coil 13, which current is applied from constant voltage source 21 via conventional constant current regulator means 22. Consequently, coil 13 produces a reference magnetic field that reacts with said stationary magnetic field to bias the reference member toward its equilibrium position. In order to compensate for variations in the constant voltage reference source 21 (and thereby to avoid the use of a relatively expensive voltage stabilized source), the voltage from source 21 is also applied across the indicator means 20 to effect a corresponding compensation of the measurement of the load compensating voltage. Consequently, fluctuations in the value of the desired voltage have an equal effect on both the current in the coil 13 and on the indication at the digital voltmeter 20, and the correctness of the indication remains unaffected.

The sensing means 6 and 6' provide that the reference member 2 is maintained precisely in its equilibrium position; when the reference member 2 is deflected from its equilibrium position a control circuit 23, 24 and 25 becomes operable in the same manner as the circuit 17 to 19 described above in relation to compensation of the load member 1, whereupon the current flowing through the correction coils 11 and 11' is increased or reduced until the resulting magnetic field has assumed a value such that the correspondingly changed reference compensation force resulting from the constant current in the coil 13, again holds precisely in its equilibrium position the reference member 2, the mass of which has remained constant.

Since the same magnetic field acts on both the reference member 2 and the load member 1, a variation in the magnetic field also affects the weighing result. Assume that a weighing operation is effected at a place which is at a lower elevation than the place at which the balance was adjusted, that is to say, has a greater acceleration due to gravity. The increased acceleration due to gravity will impart a greater downward force to the reference member 2. Consequently the reference member 2 will be moved downwardly, as the compensation current is constant. The sensing device 6 and 6' responds and by way of the current in the correction coils 11, 11' adjusts the stationary magnetic field to a higher value until the reference member 2 has again assumed its equilibrium position. The load 15 whose weight is to be determined also produces an increased force downwardly, so that with an unchanged magnetic field, the measured compensation current would not have been proportional to the mass (which is independent of elevation) but would have taken on an excessively large value. Owing to the amplification of the magnetic field, however, a correspondingly smaller current, that is to say, a current with a value which is proportional to the mass, is sufficient.

In this way changes in the magnitude of the acceleration due to gravity can no longer affect the measuring result, so that regardless of the elevation of the place of installation, the balance will provide identical weighing results for identical masses, therefore operating on the principle of comparison of mass.

The same advantage is achieved as regards errors which would otherwise result from the balance being in a slightly inclined position. With force compensation, when deviations from the vertical occur, it is only ever the cosine component of the force produced by the load which is measured. In this case however, that is without effect on the weighing result as, in the same manner as described hereinbefore, the magnetic field is varied (obviously in this case always in such a manner as to weaken the magnetic field strength) until the magnitude of the compensation current again represents a true measurement of the load to be weighed.

It follows from the above description that the subject balance is not subject to the further sources of error mentioned hereinbefore, namely those resulting from changes in the magnetic field due to fluctuations in temperature and/or aging of the magnet. In these cases the correction coils 11 and 11' again generate the original magnetic field strength by suitable variation in their energization current.

In contrast to the mode of operation when compensating the two sources of error first mentioned, in which the stationary magnetic field is in each case automatically adjusted to a suitably higher or lower value, the automatic compensation in the last mentioned case (temperature fluctuations and/or magnet aging) provides that the magnetic field is kept constant.

It is obvious that in the case, which frequently arises in practice, that more than one of the above mentioned interference effects is present simultaneously, these effects can be simultaneously compensated, so that the resulting variation in the magnetic field compensates for the sum of all the individual errors.

The symmetrical arrangement in pairs of the sensing devices 6 and 6', 7 and 7' produces the advantageous result that when fluctuations in temperature occur, the load member 1 and the reference member 2 experience changes in dimension which have their main effect in a vertical direction. By means of the illustrated arrangement of the sensing devices, the resulting changes in capacitances will in each case cancel each other out so that there is no change in the sensing signal, and consequently there is also no change in the currents in the compensation or correction coils, which would falsify the measurement result.

It has also been found desirable for the action of the spring constants of the suspension springs 4 and 4', 5 and 5' to be compensated, that is to say, any influence thereof on the deflection of the load and reference members, for example under the influence of fluctuations in temperature, should be eliminated. One possible way of doing this lies in using an electrostatically operating device for that purpose. By suitable dimensioning of the capacitors and the voltage applied thereto, when deflections from the desired position of the load member 1 and the reference member 2 occur, it is precisely possible in each case to compensate for the restoring force exerted by the resilient suspension members 4 and 4', 5 and 5' in the range which is of practical interest.

In the embodiment illustrated, the capacitive sensing devices 6 and 6', 7 and 7' are advantageously used for this purpose. This can be effected in a simple manner by a direct-current voltage of, for example, several hundred volts being superimposed on the high-frequency alternating-current voltage used for producing the signal for the deflections under load.

The corresponding direct-current voltage sources are indicated in the drawing by references 26 and 27. For adjustment purposes they are adjustable over a certain range. Resistors 28 and capacitors 29 are used in known manner to separate direct-current voltage and alternating-current voltage.

The embodiment described represents a particularly advantageous and simple form of the balance according to the invention, which permits weighing operations to be carried out with a precision of at least $10^{-5}$.

It is also possible to arrive at other embodiments of the balance according to the invention, for example by the inclusion of components which permit taring and/or by the connection of registering or plotting devices, whereby the weighing operation can be automated in known manner. The principle according to the invention of adapting the magnetic field is not limited to balances without a balance beam, but can equally be used on beam balance.

Also, instead of a top-pan balance, the balance can have a suspended load pan. The suspension of the load and reference members can also be purely magnetic, that is to say without mechanical carrier members. When the balance is provided with digital read-out, for example when using a digital voltmeter, the weighing range can be increased while simultaneously increasing the number of decimal places indicated, by the connection in of compensation current stages with separate indication.

Thus, the above balance is insensitive to the above mentioned sources of error, that is to say, in spite of the presence thereof, it has a high degree of weighing precision and reproduceability. Furthermore, it is possible to use simple, commercially available devices for reading off the measuring values, for example voltmeters which are calibrated in weight units (in the case of analog reading-off) or suitable digital voltmeters. Only a single measurement per weighing operation is necessary for determining a given weight, so that only a single measuring error can possibly falsify the result, so that the relative error is halved relative to the above described prior construction.

While in accordance with the provisions of the Patent Statutes, the preferred form and embodiment of the invention has been illustrated and described, it will be apparent to those skilled in the art that other changes and modifications may be made without deviating from the disclosed inventive concepts.

What is claimed is:

1. Electromagnetically compensated weighing apparatus, comprising
   a. a frame;
   b. magnet means (8) connected with said frame for establishing a stationary magnetic field;
   c. load-responsive means including a load member (1) connected with said frame for movement in said magnetic field, said load member being normally supported in a no-load neutral position and being displaceable in a given direction from said neutral position in response to the application thereto of a load to be measured;
   d. load compensating means operable in response to displacement of said load member from said neutral position for returning said load member to said neutral position, said load compensating means including
      1. a compensating coil (12) connected with said load member and arranged in said magnetic field; and
      2. load sensing means (7, 7', 17, 18, 19) responsive to the displacement of said load member from its neutral position for supplying a load compensating current through said load compensating coil to produce a load compensation magnetic force that reacts with said magnetic field to return said load member to said neutral position, said load compensating current being a direct function of the mass of the load to be measured; and e. correcting means for varying the strength of said stationary magnetic field to eliminate the external interference effects applied to said weighing apparatus.

2. Apparatus as defined in claim 1, wherein said magnet means includes a ferromagnetic core, and further wherein said correcting means includes at least one correction coil (11, 11') mounted on said ferromagnetic core for varying the strength of said stationary magnetic field.

3. Apparatus as defined in claim 2, wherein said correcting means further includes
   a. a reference member (2) of constant mass connected with said frame for movement in said stationary magnetic field;
   b. a reference compensation coil (13) connected with said reference member;
   c. means for supplying a constant current through said reference coil to produce a reference compensation magnetic force that reacts with said magnetic field to bias said reference member toward its equilibrium position; and
   d. reference sensing means (6, 6', 23, 24, 25) for applying through said correction coil a correcting current that is a function of the displacement of said reference member from its equilibrium position.

4. Apparatus as defined in claim 3, wherein said balance is of the beamless type, wherein said magnet means includes a cylindrical pot type magnet system, and further wherein said load member, said reference member and said correction coil are each of substantially cylindrical symmetrical construction and include portions arranged at least partially within said magnet system.

5. Apparatus as defined in claim 4, wherein said reference member is arranged generally concentrically relative to said correcting coil.

6. Apparatus as defined in claim 4, wherein each of said load and reference sensing means comprises a pair of displacement sensing components (6, 6'; 7, 7'), said pairs of components being symmetrically arranged longitudinally of said load and reference members, respectively, to automatically compensate for variations in length of said members in response to temperature change.

7. Apparatus as defined in claim 3, and further including spring means (4, 4'; 5, 5') resiliently connecting each of said load and reference members with said frame in the manner of a parallelogram, and means for automatically compensating the restoring forces of said spring means independently of each other.

8. Apparatus as defined in claim 7, wherein said last named means comprises electrostatic means.

9. Apparatus as defined in claim 8, wherein each of said load and reference sensing means comprises capacitive components operable to compensate for said restoring forces, and further wherein said electrostatic means includes means (26, 27, 28) for superimposing constant direct-current voltages upon the displacement signals produced by said load and reference sensing means, respectively.

10. Apparatus as defined in claim 3, wherein said constant current supply means includes a constant voltage source (21); wherein said weighing apparatus further includes indicator means (20) for indicating the magnitude of the load compensating current supplied through said load compensating coil; and further including means for connecting said constant voltage source with said indicator means to compensate for variations in the voltage of said constant voltage source.

* * * * *